Patented Aug. 1, 1939

2,167,726

UNITED STATES PATENT OFFICE 2,167,726

PROCESS FOR THICKENING UNSATURATED OILS

Roger W. Richardson, Baton Rouge, La., assignor to Standard Oil Development Company, a corporation of Delaware No Drawing. Application January 28, 1936, Serial No. 61,180

10 Claims. (Cl. 204—31)

This invention relates to an improved method for increasing the viscosity of unsaturated oils, and to improved condensation products thereby obtained. It relates more particularly to the treatment of unsaturated oils containing combined oxygen, such as the naturally occurring animal, vegetable and fish oils, by an improved process in which said oils are hydrogenated and are then subjected to treatment with a silent electric discharge, or "voltolization".

Various oils have been increased greatly in viscosity and molecular weight by subjection to silent electric discharge in the voltolization process. By this means condensation products of extremely high viscosity, for example above 2000 seconds Saybolt at 210° F., have been prepared which are soluble in petroleum lubricating oils and which may be used alone or in blends in such oils as lubricants of high quality.

It has now been found that a jelly-like product is formed on subjecting unsaturated oils to voltolization. This product is insoluble in both the oily condensation product and in petroleum lubricating oils, and its formation greatly impairs the quality of the voltolized oil and also causes operating difficulties due to decreased capacity and partial or even complete plugging up of the voltolizing equipment. The formation of this product is noticed particularly in the voltolization of oils having an iodine value above about 100 to 150. For example, when voltolizing menhaden oil, of an iodine number of about 180, even in a blend with an equal amount of mineral oil, the formation of jelly-like product is apparent when the oil is thickened to a viscosity of only 300 to 400 seconds Saybolt at 210° F., and such product is formed at much lower viscosities when voltolizing the menhaden oil alone.

It is an object of this invention to prepare, from unsaturated oils, thickened products which are substantially free from such jelly-like, insoluble products. Another object of this invention is to provide an improved process whereby the preparation of thickened products by voltolization may be simplified and the capacity of the voltolization equipment increased. Other and further objects of this invention will be apparent from the present description and the claims.

The oil to be voltolized is first hydrogenated to such an extent that the formation of jelly-like, insoluble products on voltolization is greatly decreased and in many cases is substantially eliminated. This hydrogenation may be accomplished by any suitable means, including the ordinary methods for fat hardening in which the oil is subjected to treatment with hydrogen in the presence of a nickel catalyst at temperatures of about 200 to 450° F. at atmospheric or elevated pressure. It is preferable to use oils having an iodine value above about 110, and preferably of the order of 150 or higher, as the initial material and to hydrogenate the oil to such an extent that the hydrogenated oil has an iodine value between about 100 to 75 or 50, but even more extensive hydrogenation, as to a substantially saturated oil, having iodine values below 10, is also contemplated.

The following example is presented to illustrate one suitable method for conducting the present invention, and is not to be construed as limiting the invention in any way:

Example I

A menhaden oil of about 180 iodine value is hydrogenated with hydrogen over a nickel catalyst to a product having an iodine value of about 100. This hydrogenated menhaden oil is then subjected to silent electric discharge in a trommel-type voltolizer at an absolute pressure of about 4 to 6 cm. of mercury and an electric potential of 4000 volts at a frequency of 10,000 cycles per second. When the oil is thickened to a viscosity of about 600 seconds at 210° F., a petroleum lubricating oil having a Saybolt viscosity of about 70 seconds at 210° F. is added in small amounts to the voltolized oil and the mixture is further voltolized until a product is obtained which has a viscosity of 1000 seconds at 210° F., and which contains equal parts of hydrogenated menhaden oil and mineral oil. This product is a clear, viscous oil, which is free of any indication of jelly-like or insoluble matter.

In comparison with the above example, unhydrogenated menhaden oil forms large amounts of insoluble jelly when voltolized under the same conditions, in a blend with an equal volume of the same mineral oil, to a viscosity of only 300 to 400 seconds at 210° F.

The voltolized products of this invention may be added to petroleum lubricating oils in any amount to increase their viscosity and raise their viscosity index. They also improve the oiliness of such lubricating oils, and, in amounts of about 10% or more, serve to decrease sludge formation therefrom in use, particularly in internal combustion engines. In smaller amounts of ½, 1, 2 to 5% or more, they may be used as an oxidation inhibitor in oils, particularly in highly refined petroleum lubricants (refined with fuming sulfuric acid, or by other means adapted to raise the viscosity index substantially) which have a high rate of oxidation.

The voltolized product also has the property of decreasing the pour point of waxy lubricating oils when added thereto in small amounts, preferably below about 10%, such as ½ to 2 or 5%.

Oils which are suitable for the combined hydrogenation and voltolization treatments of the present invention include the unsaturated oils broadly, particularly esters having a carbon chain of more than 8 carbon atoms. Examples of such oils are the following, which may be used directly in the crude state as obtained or after refining to any desired degree: Cod oil, herring oil, salmon oil, sardine oil, whale oil, menhaden oil, seal oil, soya bean oil, candlenut oil, corn oil, cottonseed oil, peanut oil, and the like. Menhaden oil is a particularly desirable stock for treatment according to this invention because of its availability and cheapness. The still more unsaturated drying oils, such as linseed oil, may also be used, but are ordinarily not preferred because of their cost.

The hydrogenated oils may then be subjected alone to the treatment with silent electric discharge, or they may be mixed with other oils as desired. For example, an oil which has been hydrogenated to a very low iodine value, say below 20, may be mixed with unhydrogenated or less intensively hydrogenated unsaturated oils to secure a blend having an intermediate iodine value between those of the original unsaturated oil and the intensively hydrogenated oil. Such blends may be prepared from oils derived from the same original oil, or from different types of oils.

The voltolization treatment is conducted by subjecting the hydrogenated oil, or blends containing it, to the action of a silent electric discharge in any suitable apparatus. For example, the oil may be passed in a thin film between electrodes, having an electrode potential of about 1000 to 10,000 volts at a frequency of 500 to 10,000 cycles per second, in a reaction chamber maintained at an absolute pressure below about 20 cm. of mercury and preferably at a pressure of about 2 to 10 cm.

It is customary in voltolizing ester oils, such as the glyceride fatty oils, to subject the oil to voltolization alone until it has been thickened as far as practicable without danger of formation of insoluble products, and then to blend the voltolized product with a mineral oil and to continue voltolization until a blend, containing abut 50% of mineral oil and having the desired viscosity, is secured. The mineral oil is preferably a viscous lubricating oil, suitably having a viscosity of about 50 to 70 seconds at 210° F. In the use of relatively highly unsaturated oils such as menhaden oil, it is necessary to add mineral oil before the voltolized product has been thickened to about 300 seconds Saybolt viscosity at 210° F. By the present invention, such unsaturated oils are first hydrogenated, and may then be voltolized alone to much higher viscosities of the order of 1000 seconds or more before it is necessary to add mineral oil. In many cases the voltolization may be completed on the hydrogenated oil alone, and this product may then be blended with mineral oil to prepare a much greater amount of a blend of the same viscosity than can be prepared with the same voltolizer capacity and electrical energy from the unhydrogenated oil. For example, an ester oil having an iodine value of about 80 can be voltolized to a viscosity of more than 2000 without the formation of any jelly-like insoluble product.

The voltolized hydrogenated oils produced according to this invention may be used alone as lubricants, or they may be used in blends in any desired proportion, from about 1 to 99%, with other lubricants, including petroleum lubricating oils, greases and the soaps commonly used therein, mineral waxes including paraffin wax and petrolatum, and the like.

This invention is not to be limited to any examples or explanations, all of which have been presented herein solely for purpose of illustration, but is limited only by the following claims, in which it is desired to claim all novelty insofar as the prior art permits.

I claim:

1. Process for increasing the viscosity of unsaturated fatty oils having iodine numbers above about 150 comprising separately hydrogenating the fatty oil in an initial stage to reduce the iodine number of said oil below about 100 and then in a secondary stage, subjecting the hydrogenated oil to the action of a silent electric discharge in order to polymerize the same.

2. Process for preparing improved condensation products from natural unsaturated ester fatty oils having iodine numbers above about 150 comprising hydrogenating the fatty oil in an initial stage in order to reduce the iodine number to below about 100, and then subjecting the hydrogenated oil in a secondary stage to the action of a silent electric discharge in order to polymerize the same.

3. Process for preparing improved condensation products from natural unsaturated fatty oils having a carbon chain of more than 8 carbon atoms and an iodine value above about 150 comprising hydrogenating said fatty oils in an initial stage to obtain a hydrogenated oil having an iodine number below about 100, and then subjecting said hydrogenated oil in a secondary stage to the effect of the silent electric discharge in order to polymerize the same.

4. Process in accordance with claim 3 in which said oil is hydrogenated to an iodine value below about 50.

5. Process according to claim 3 in which said hydrogenated oil is polymerized by means of the silent electric discharge to a viscosity above 1000 seconds Saybolt at 200° F.

6. Process according to claim 3 in which said oil is a fish oil.

7. Process in accordance with claim 3 in which said oil is menhaden oil.

8. Process according to claim 3 in which said oil is a glyceride.

9. Process for increasing the viscosity of unsaturated fatty oils having iodine numbers above about 150 to form a viscous high viscosity clear polymer without the formation of jelly-like substances comprising hydrogenating the fatty oil to an iodine number below about 100, and then subjecting the hydrogenated oil to the action of a silent electric discharge in order to polymerize the same.

10. Process for increasing the viscosity of unsaturated fatty oils having iodine numbers above about 150 comprising eliminating constituents which form pelly-like insoluble substances upon treatment with a silent electric discharge by hydrogenating the fatty oil to reduce its iodine number to below about 100, and then in a secondary stage subjecting the hydrogenated oil to the action of a silent electric discharge in order to polymerize the same.

ROGER W. RICHARDSON.